(12) United States Patent
Noordover et al.

(10) Patent No.: US 9,400,084 B2
(45) Date of Patent: Jul. 26, 2016

(54) LUBRICATION DEVICE AND PROTECTIVE COVER FOR A LUBRICATION DEVICE

(75) Inventors: Alain Noordover, Utrecht (NL); Guus Willems, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 198 days.

(21) Appl. No.: 14/233,859

(22) PCT Filed: Jul. 20, 2011

(86) PCT No.: PCT/EP2011/062492
§ 371 (c)(1),
(2), (4) Date: Feb. 25, 2014

(87) PCT Pub. No.: WO2013/010589
PCT Pub. Date: Jan. 24, 2013

(65) Prior Publication Data
US 2014/0190772 A1    Jul. 10, 2014

(51) Int. Cl.
*F16N 21/06* (2006.01)
*F16N 11/04* (2006.01)
*F16N 11/08* (2006.01)
*F16N 11/10* (2006.01)
*F16N 11/00* (2006.01)
*F16N 11/02* (2006.01)

(52) U.S. Cl.
CPC ............... *F16N 21/06* (2013.01); *F16N 11/00* (2013.01); *F16N 11/02* (2013.01); *F16N 11/04* (2013.01); *F16N 11/08* (2013.01); *F16N 11/10* (2013.01); *Y10T 29/49826* (2015.01)

(58) Field of Classification Search
CPC ...................................................... F16N 21/06
USPC ........................................................ 184/14, 39
See application file for complete search history.

(56) References Cited

U.S. PATENT DOCUMENTS

| | | | | |
|---|---|---|---|---|
| 3,583,263 | A * | 6/1971 | Herigstad | B67B 7/18 81/124.1 |
| 4,744,442 | A * | 5/1988 | Bras | F16N 11/10 184/39 |
| 4,766,781 | A * | 8/1988 | Grise | B67B 7/18 81/3.4 |

(Continued)

FOREIGN PATENT DOCUMENTS

| | | |
|---|---|---|
| DE | 102004013592 A1 | 10/2005 |
| EP | 2572136 B1 | 2/2014 |

(Continued)

*Primary Examiner* — William E Dondero
*Assistant Examiner* — Mark K Buse
(74) *Attorney, Agent, or Firm* — Bryan Peckjian; SKF USA Inc. Patent Dept.

(57) ABSTRACT

A lubrication device is provided comprising a lubricant container (1) for containing a lubricant, an outlet opening and an adjustable release mechanism. The outlet opening is provided at a first end of the lubricant container (1) for releasing the lubricant. The adjustable release mechanism comprises, at a second end of the lubricant container (1), an insert (5) which is rotatable relative to the lubricant container (1) for setting a release rate of the lubricant. The lubrication device (1) further comprises a protective cap (6) comprising a hard cover (7). The hard cover (7) covers the insert (5) and the second end of the lubricant container (1). The hard cover (7) has a smooth outer surface and an inner surface comprising engaging means (9) for engaging with the insert (5), such that the protective cap (6) is rotatable together with the insert.

12 Claims, 4 Drawing Sheets

(56) References Cited

U.S. PATENT DOCUMENTS

| | | | | |
|---|---|---|---|---|
| 5,404,966 A * | 4/1995 | Yang | ................ | F16N 11/10 184/108 |
| 5,598,901 A * | 2/1997 | Graf | ................ | F16N 11/10 184/108 |
| 5,667,037 A * | 9/1997 | Orlitzky | ................ | F16N 11/10 184/108 |
| 6,935,207 B2 * | 8/2005 | Mazza | ................ | B67B 7/182 81/3.2 |
| 7,954,601 B2 * | 6/2011 | Graf | ................ | F16N 11/08 184/39 |
| 2004/0099097 A1 * | 5/2004 | Mazza | ................ | B67B 7/182 81/3.2 |
| 2008/0060879 A1 * | 3/2008 | Orlitzky | ................ | F16N 11/10 184/39 |
| 2009/0014404 A1 * | 1/2009 | Russell | ................ | B65D 50/041 215/220 |
| 2009/0038888 A1 * | 2/2009 | Eisenbacher | ........... | H01M 6/34 184/39 |
| 2011/0315485 A1 * | 12/2011 | Morper | ................ | F16N 11/10 184/39 |

FOREIGN PATENT DOCUMENTS

| | | |
|---|---|---|
| WO | 8908800 A1 | 9/1989 |
| WO | 9325841 A1 | 12/1993 |

\* cited by examiner

LUBRICATION DEVICE AND PROTECTIVE COVER FOR A LUBRICATION DEVICE

CROSS-REFERENCE

This application is the U.S. national stage of International Application No. PCT/EP2011/062492 filed on Jul. 20, 2011, the contents of which are hereby fully incorporated by reference.

FIELD OF THE INVENTION

This invention relates to a lubrication device comprising a lubricant container for containing a lubricant, an outlet opening and an adjustable release mechanism. The outlet opening is provided at a first end of the lubricant container for releasing the lubricant. The adjustable release mechanism comprises, at a second end of the lubricant container, an insert which is rotatable relative to the lubricant container for setting a release rate of the lubricant.

BACKGROUND OF THE INVENTION

In industry, there is a constant need to lubricate moving systems, such as moving axles, rotating bearings and other machine elements having surfaces that bear and glide on each other. Especially for systems where high loads are imposed on the bearing surfaces and/or where the speed, either rotational or linear, is relatively high, there is a need to lubricate the surfaces. The periodicity of the application of lubricant and the amount of lubrication applied may vary extensively. In some cases, a small amount of lubricant may be required every day and in other cases, lubrication may be performed every three months.

SKF has developed and sold automatic lubricator devices with adjustable release mechanisms. Such a lubrication device is, e.g., described in the applicant's patent application PCT/EP2010/003129. The release mechanism comprises a combination of a collar and an insert. The collar is provided at one end of the lubrication container. The insert is received within the collar, whereby the collar and the insert are relatively rotatable for setting a release rate of the lubricant. The top of the insert comprises notches for allowing a user to grab the insert with his fingers and to rotate the insert relative to the collar. Rotation of the insert varies a resistance that is in electrical connection with a gas generation battery housed within the insert, to thereby vary an amount of gas generated and vary the lubricant release rate.

Another example of a lubrication device with an adjustable release mechanism comprising a collar and a rotatable insert is disclosed in U.S. Pat. No. 7,954,601. In this example, the collar houses an electrochemical cell for generating gas and the insert comprises a rotary switch for setting the amount of gas generated. The collar can be a separate piece or integral with the lubricant container. A top surface of the insert has a slot for receiving e.g. a coin or other tool for rotating the insert.

In the food industry, machinery is often cleaned using high pressure water streams. For the known automatic lubrication devices, this cleaning and washing leads to two problems. The first problem is that the high pressure water streams may penetrate the narrow spaces in between the collar and the insert. As a result, water may penetrate into the chamber which houses e.g. gas generation means. The second problem is water accumulation. Water may accumulate in the narrow spaces between the collar and the insert or in the notches provided for gripping the insert. The accumulated water then serves as a source of bacteria. In food industry, where hygiene is a very important issue, the emergence of such bacteria is to be avoided.

OBJECT OF THE INVENTION

It is an object of the invention to provide a lubrication device that can be cleaned using water, without having the aforementioned problems.

SUMMARY OF THE INVENTION

According to a first aspect of the invention, this object is achieved by providing the lubrication device of the opening paragraph with a protective cap comprising a hard cover. The hard cover covers the insert and the second end of the lubricant container. The hard cover has a smooth outer surface and an inner surface comprising engaging means for engaging with the insert, such that the protective cap is rotatable together with the insert.

When water is sprayed over this lubrication device during cleaning of the machinery, it will flow over the protective cap instead of accumulating in the notches and narrow spaces of the collar and the insert. The water easily flows over the smooth surface of the hard cover without being hindered by any irregularities. Additionally, the hard cover shields the narrow spaces between the collar and the insert to prevent the penetration of water into the lubrication device.

A protective cap only having the hard cover would, however, give rise to new problems. When the protective cap covers the insert, it is not possible to rotate the insert. For setting the release mechanism, the protective cap first has to be removed. The protective cap has then to be re-installed before cleaning the machinery. This problem is solved by providing engaging means at the inner surface of the hard cover. The engaging means engage with the insert, such that the protective cap is rotatable together with the insert. As a result, the release mechanism can be adjusted without removing the protective cap.

In a preferred embodiment, the protective cap further comprises a sealing ring. The hard cover has a top part that covers the second end of the lubrication device. Suitably, the hard cover further has a cylindrical part that surrounds a side wall of the lubricant container at the second end. The sealing ring is suitably attached to the cylindrical part of the hard cover, and provides a waterproof enclosure between the lubricant container and the protective cap. Without the sealing ring, there would be some open space between the protective cap and the container. When the lubrication device is arranged horizontally, this open space would provide a site for accumulation of water. The sealing ring closes any gaps, without hindering the rotational movement of the protective cap relative to the lubricant container.

In a further embodiment, the hard cover is made of a transparent material. On top of the collar and the insert of the known lubrication devices, indicators are provided for showing the release rate set by the release mechanism. If a transparent cover is used, the indicators are also visible when the protective cap is applied to the device. For example, glass or transparent plastics may be used for the hard cover of the protective cap.

In an alternative embodiment, an outer surface of the sealing ring and an outer surface of the lubricant container both comprise a visual indicator, the visual indicators being arranged such that a rotation of the protective cap relative to the lubrication container results in showing the release rate set by the release mechanism. With the indicators on the sealing ring and the lubricant container, no transparent cover is required for allowing a user to know the set release rate without removing the protective cap from the collar.

According to a second aspect of the invention, a protective cap with engagement means is provided for use with a lubrication device as described in the opening paragraph. Such protective caps may be sold separately with the purpose to protect lubrication devices already bought and possibly installed earlier. Protective caps with different shapes and dimensions may be sold in order to fit different types of existing lubrication devices. The engagement means which cooperate with the insert may comprise, for example, a shaped protrusion that fits inside a shaped recess in the insert. Alternatively, the engagement means may comprise a shaped recess for receiving a correspondingly shaped protrusion on the insert.

Thus, a protective cap according to the invention not only serves as a waterproof covering, but also as an adjustment tool. Furthermore, since most commercially available lubrication devices have a diameter of less than 120 mm, the protective cap enables easy adjustment by hand.

According to a further aspect of the invention, a method of covering a lubrication device is provided, the method comprising a step of applying a protective cap as described above in such a way that the engaging means are engaged with the insert.

These and other aspects of the invention are apparent from and will be elucidated with reference to the embodiments described hereinafter.

DETAILED DESCRIPTION OF THE INVENTION

Figure 1:
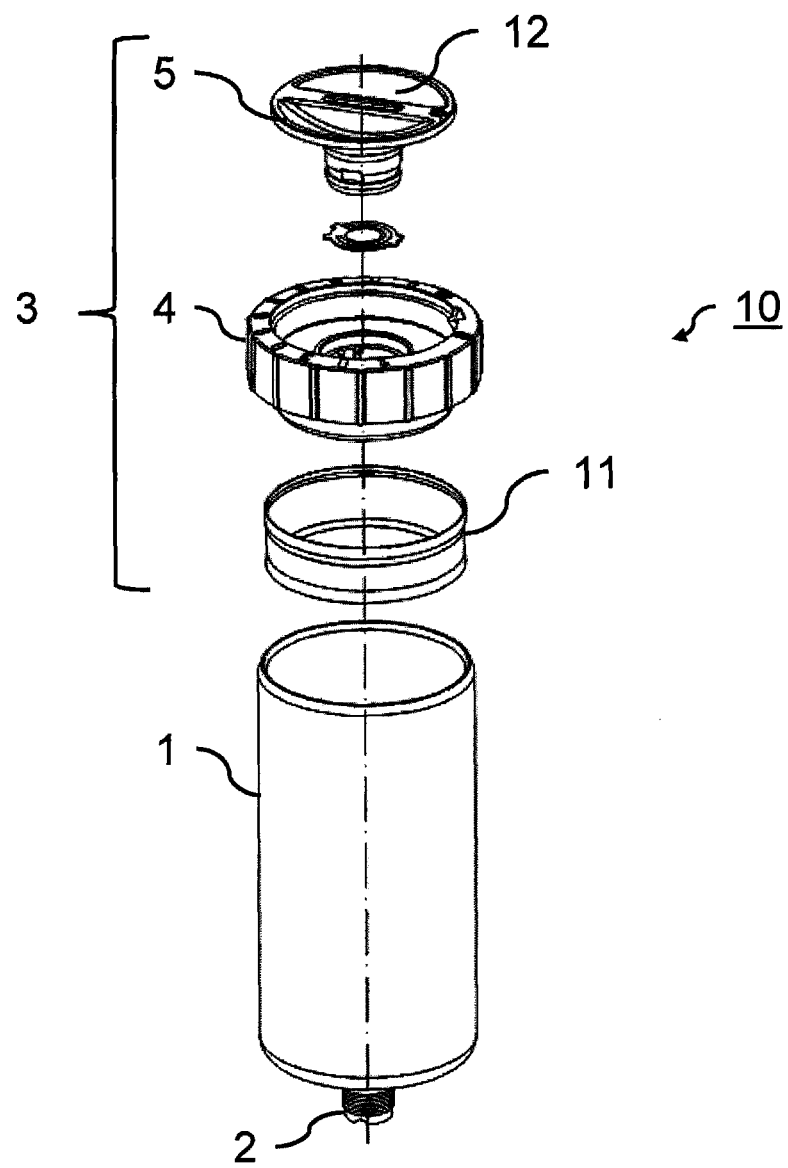
FIG. 1 schematically shows an exploded view of an example of a lubrication device.

FIG. 1 schematically shows an exploded view of an example of a lubrication device 10. The device 10 comprises a lubricant container 1 for containing the lubricant. The lubricant container 1 comprises, at one end, an outlet 2 for releasing the lubricant. At the other end, an adjustable release mechanism 3 is provided. In this example, the release mechanism 3 comprises a piston 11 for pushing the lubricant downwards through the outlet 2 to lubricate the parts to be lubricated. The movement of the piston 11 may, e.g., be induced by a spring, a gas generating container, or a linear actuator. The speed of the piston movement depends on, e.g., the force exerted on the piston 11, the constitution of the lubricant and the dimensions and materials of the lubricant container 1 and the outlet 2. The adjustable release mechanism 3 allows a user to control the force exerted on the piston 11 and therewith also the release rate of the lubricant. It is to be noted, that the use of a piston 11 is not necessary. For example, the lubricant may be held within a collapsible bag which is compressed by a growing volume of generated gas.

The release mechanism 3 further comprises a collar 4 and an insert 5. The different elements of the release mechanism are arranged such that a rotation of the insert 5 relative to the collar 4 affects the release rate of the lubricant, e.g., by adjusting the force exerted by a spring or the gas generation rate in a gas generating container. An example of such a release mechanism 3 is found in the applicant's patent application PCT/EP2010/003129. In this example, the collar 4 is fixedly attached to the lubricant container 1 (see also FIG. 4) and encloses an upper part of the container wall. The insert 5 is inserted into the collar 4. The insert 5 comprises recesses 12 for enabling a user to grasp and rotate the insert 5 with his fingers or some tool.

In alternative embodiments, the insert 5 may be fixedly attached to the container 1 and the collar 4 is rotatable with respect to the container 1 and the insert 5. In a further embodiment, the collar 4 and the insert 5 are fixedly attached to each other or are made in one piece. In that embodiment, the collar 4 and insert 5 combination can be rotated relative to the container 1 for adjusting the release mechanism 3 and the release rate of the lubricant.

Figure 2:
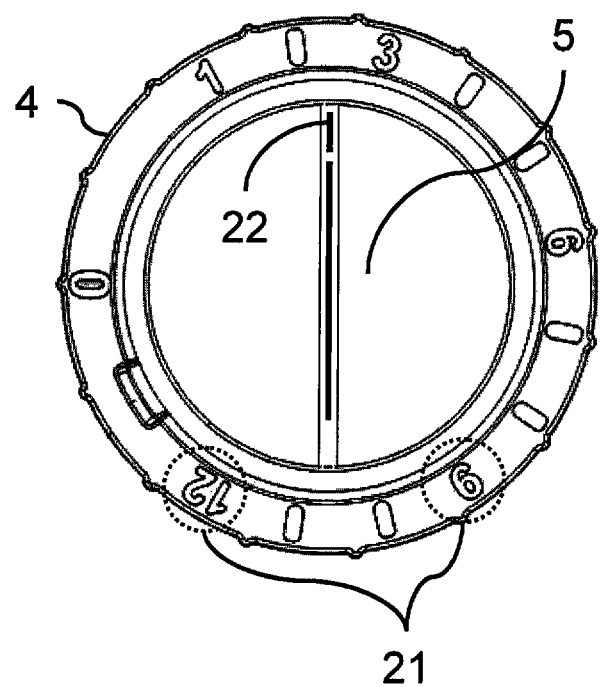
FIG. 2 shows a top view of the lubrication device of FIG. 1.

FIG. 2 shows a top view of the lubrication device 10. The top view shows part of the collar 4 and the insert 5. The collar 4 comprises a face dial with, e.g., numbers 21 indicating a lubricant release rate. For example, the numbers 21 may indicate a number of hours or days needed to empty the complete lubricant container 1. The insert 5 preferably comprises an indicator 22, pointing towards a position on the face dial. After rotating the insert 5 relative to the collar 4, the indicator 22 points towards a different point on the face dial. The release mechanism 3 and the face dial are arranged such that the release rate of the lubricant corresponds to face dial position indicated by the indicator 22.

In embodiments wherein the insert 5 is fixed with respect to the container and the collar 4 is rotatable relative to the container, the face dial and the indicator 22 function similarly. In embodiments wherein the collar 4 and the insert 5 are fixedly attached, a face dial and an indicator may be provided at the side surfaces of the collar 4 and the lubricant container 1 for indicating the newly set release rate when the collar 4 is rotated with respect to the container 1.

Figure 3:
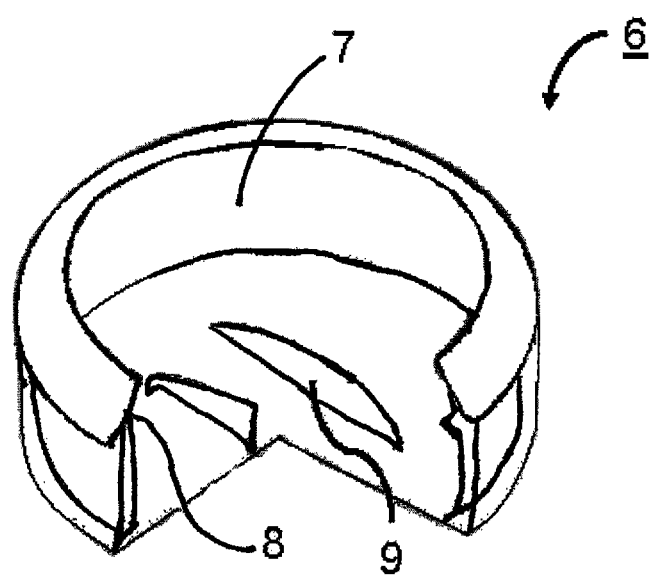
FIG. 3 shows an embodiment of a protective cap according to the invention.

FIG. 3 shows an embodiment of a protective cap 6 according to the invention. The protective cap 6 comprises a hard cover 7 and a softer sealing ring 8. The hard cover 7 may, e.g., be made of hard plastics, metal, glass or combinations of different hard materials. Engaging means 9 are provided at the inner surface of the cover 7 and may be made of the same material as the cover 7. The shape of the engaging means 9 is such that they engage with the insert 5 when the protective cap 6 is applied to the lubrication device 10. When the protective cap 6 is applied to the lubrication device 10 such that the engaging means 9 engage with the insert, the user can rotate the cap 6 relative to the lubricant container 1. This rotation results in a corresponding change of the lubricant release rate set by the adjustable release mechanism 3. The material of the hard cover 7 preferably is hard enough for avoiding excessive deformation of the cover 7 when rotating it by hand. The side walls of the hard cover 7 may at least partly be uneven to facilitate gripping and rotating the protective cap 6 by hand. Any ridges or other types of irregularities are preferably arranged vertically, such that they cannot trap any water.

The sealing ring 8 is made of a softer material, like soft plastics or rubber. The sealing ring 8 is projected inward for enclosing the lubricant container 1 and providing a waterproof enclosure of the collar 4 and the insert 5 when the protective cap 6 is applied to the lubrication device 10. To avoid water from adhering to the surface of the protective cover 6, a water resistant coating may be applied to the hard cover 7 and/or the sealing ring 8.

In the figure, the protective cap 6 is cylindrical with slightly rounded edges. The rounded edges help to let the water slip away from the surface of the protective cap 6. In a preferred embodiment, the top surface of the protective cap 6 is dome shaped to further facilitate the run-off of the water.

Figure 4:
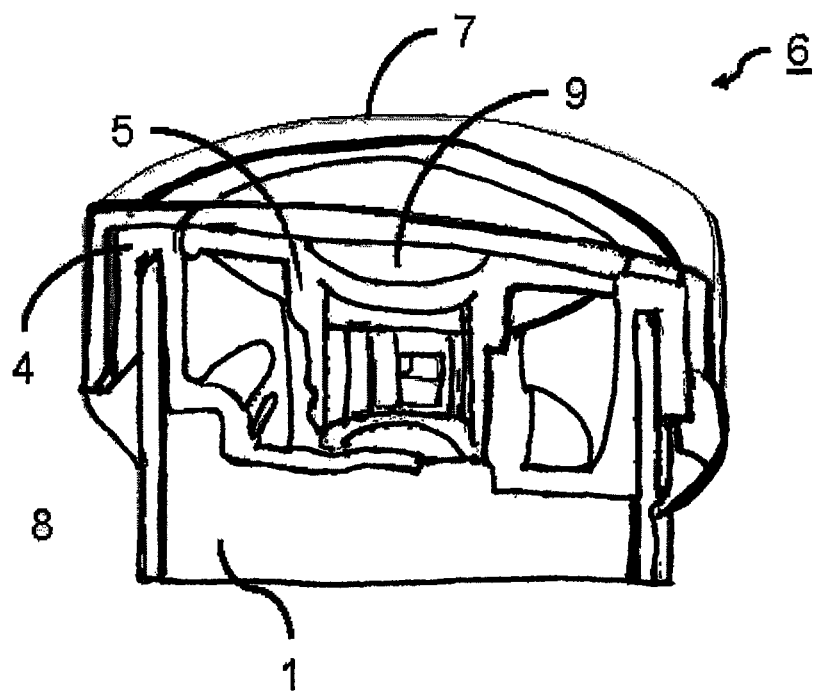
FIG. 4 shows a cut view of the protective cap applied to a lubrication device.

FIG. 4 shows a cut view of the protective cap 6 applied to the lubricant container 1 of a lubrication device 10. The engaging means 9 of the hard cover 7 are engaged with a recess of the insert 5. In this example hard cover 7 is made of an at least partly transparent material for ensuring the visibility of the face dial on the collar 4 surface. In an alternative embodiment, a face dial may be provided on the surface of the lubricant container 1. An indicator mark at the sealing ring 8 and/or at the side wall of the hard cover 7 may then indicate the current setting of the adjustable release mechanism 3. The current setting may be shown in a similar way when the indicator mark is provided at the container 1 surface and the face dial is provided at the sealing ring 8 and/or side wall of the hard cover 7.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lubrication device comprising:
   a lubricant container for containing a lubricant,
   an outlet opening at a first end of the lubricant container for releasing the lubricant,
   an adjustable release mechanism having, at a second end of the lubricant container, an insert which is rotatable relative to the lubricant container for setting a release rate of the lubricant, and
   a protective cap having a hard cover for covering the insert and the second end of the lubricant container, the hard cover having a smooth outer surface and an inner surface providing engaging means for engaging with the insert, such that the protective cap is rotatable together with the insert, the protective cap further comprises a sealing ring, attached to the hard cover and providing a waterproof enclosure of the lubricant container by the protective cap wherein an outer surface of the sealing ring and an outer surface of the lubricant container both include a visual indicator, the visual indicators being arranged such that a rotation of the protective cap relative to the lubrication container results in showing the release rate set by the release mechanism.

2. The lubrication device as claimed in claim 1, wherein the insert has a groove therein positioned adjacent to the protective cap.

3. The lubrication device as claimed in claim 2, wherein wherein the engagement means comprises a flange positioned on the inner surface of the protective cap, the flange being configured to engage the groove in the insert such that the protective cap is rotatable with the insert.

4. The lubrication device as claimed in claim 2, wherein the sealing ring is made of rubber.

5. The lubrication device as claimed in claim 1, wherein the hard cover is made of a transparent material.

6. The lubrication device as claimed in claim 1, wherein a top surface of the protective cap is dome shaped.

7. The lubrication device as claimed in claim 1, wherein a surface of a side wall of the hard cover is at least partly uneven for facilitating gripping and rotating the protective cap.

8. The lubrication device as claimed in claim 1, wherein the hard cover is made of a hard plastic material.

9. The lubrication device as claimed in claim 1, wherein the sealing ring abuts an outermost circumferential portion of the lubricant container such that the sealing ring is entirely located radially outside of the outermost circumferential portion of the lubricant container.

10. A lubrication device comprising:
    a lubricant container for containing a lubricant,
    an outlet opening at a first end of the lubricant container for releasing the lubricant,
    an adjustable release mechanism having, at a second end of the lubricant container, an insert which is rotatable relative to the lubricant container for setting a release rate of the lubricant, the insert having a groove therein located at the second end of the lubricant container, and
    a protective cap having a hard cover for covering the insert and the second end of the lubricant container, the hard cover having a smooth outer surface and an inner surface having a flange which extends generally perpendicularly therefrom for engaging the groove of the insert such that the protective cap is rotatable together with the insert while the lubricant container does not rotate.

11. The lubrication device of claim 10, wherein the protective cap further comprises a sealing ring, attached to the hard cover and providing a waterproof enclosure of the lubricant container by the protective cap.

12. The lubrication device of claim 11, wherein an outer surface of the sealing ring and an outer surface of the lubricant container both include a visual indicator, the visual indicators being arranged such that a rotation of the protective cap relative to the lubrication container results in showing the release rate set by the release mechanism.

\* \* \* \* \*